United States Patent [19]

Yatabe et al.

[11] Patent Number: 4,639,069
[45] Date of Patent: Jan. 27, 1987

[54] OPTICAL LAMINAR STRUCTURE

[75] Inventors: Toshiaki Yatabe, Tokyo; Toshio Nishihara, Yamaguchi; Nobuo Suzuki, Tokyo, all of Japan

[73] Assignee: Teijin Limited, Osaka, Japan

[21] Appl. No.: 508,707

[22] Filed: Jun. 28, 1983

[30] Foreign Application Priority Data

Jun. 30, 1982 [JP] Japan ................................. 57-115331
Dec. 15, 1982 [JP] Japan ................................. 57-218438
Dec. 17, 1982 [JP] Japan ................................. 57-220279
Dec. 17, 1982 [JP] Japan ................................. 57-220280

[51] Int. Cl.$^4$ .......................... G02B 5/24; G02B 5/28; B05B 5/00; B05D 5/06
[52] U.S. Cl. ..................................... 350/1.7; 350/166; 427/160; 427/164
[58] Field of Search ................. 350/1.7, 1.6, 311, 166; 428/457, 458, 412, 419; 427/164, 160

[56] References Cited

U.S. PATENT DOCUMENTS

| 3,990,784 | 11/1976 | Gelber | 350/166 |
| 4,330,587 | 5/1982 | Woodbury | 428/458 |
| 4,333,983 | 6/1983 | Allen | 427/164 |
| 4,368,945 | 1/1983 | Fujimuni et al. | 350/1.7 |
| 4,386,130 | 5/1983 | Hayashi et al. | 428/458 |

Primary Examiner—John K. Corbin
Assistant Examiner—David J. Edmondson
Attorney, Agent, or Firm—Sughrue, Mion, Zinn, Macpeak & Seas

[57] ABSTRACT

This invention provides an optical laminar structure having an optically selective transmitting function accordant with light wavelength, whereby it is capable of having high transmittance for visible ray and low transmittance for near infrared ray and infrared ray, so that said optical laminar structure can be offered at a low price to expand its applications not only in special optical lines but also in general glazing use.

5 Claims, 2 Drawing Figures

OPTICAL LAMINAR STRUCTURE

The present invention relates to an optical laminar structure having selective transmittability, wherefore it is highly capable of transmitting visible rays but is much less admissive of transmitting near infrared rays and infrared rays and is especially concerned with an improved optical laminar structure of a Fabry-Pérot filter type comprising two metal layers and one dielectric layer laid in between them.

It is known that a laminar structure which selectively reflects the rays in a specific region of wave length is generally obtained by controlling the thickness of each component layer of the laminar structure which comprises transparent highly refractive dielectric layers and a conductive metal layer of a metal such as gold, silver, copper, etc. or an alloy, which is mainly made of such metals, laid in between them.

Especially, a laminar structure which is transparent for visible rays and capable of selectively reflecting rays in the region of infrared wave length has a promising field of application for the windows of buildings and houses as a transparent heat reflecting film in view of energy saving and solar energy utilizing. However, in order to further enhance the coefficient of utilization of an optical laminar structure in view of energy saving in the field of buildings and houses, effective results are expected from improving its selective function, that is, enhanced transmittance property for the visible ray region (450 nm to 700 nm) and reduced transmittance property for the near infrared ray region (701 nm to 2100 nm). If the transmittance property of the optical laminar structure for the near infrared ray region which occupies about 50% of the whole solar energy radiation can be reduced and the transmittance property for the visible ray region can be improved, the thermal insulation effect can be enhanced without causing environmental disruption due to the reflection while maintaining its lookthrough transparency at a high degree. If an optical laminar structure having such high selectivity is made obtainable at a low price, its applications will be extended far beyong those mentioned above. For example, the improved heat insulation property of a peep hole cover of the high temperature operation chamber, improved air conditioning effect of the vehicles such as cars, trains, etc. resulting from the increased effect of cutting off the solar energy from coming through the windows, heightened thermal insulation effect of transparent food containers, and improved thermal insulation effect of refrigerator show cases may be mentioned. As the optical laminar structures having such selective transmitting property, an optical laminar structure of a Fabry-Pérot filter type comprising two translucent metal layers and a transparent dielectric layer having a specific optically determined thickness laid in between them so that it may transmit the rays of specific wave length is known, as disclosed in detail in the specifications of U.S. Pat. Nos. 3,682,528 and 3,990,784, in addition to the aforementioned optical laminar structure comprising contrariwise two transparent highly refractive dielectric layers and said conductive metal layer laid in between them.

However, the optical laminar structure of a Fabry-Pérot filter type has hitherto been used in the field of precision optical instruments where metal oxides having a stable optical constant and low absorption are soley used as the transparent highly refractive dielectric layer in view of securing the optical stability. Its use in the windows of buildings, cars, trains, etc. for the purpose of energy saving, inclusive of cutting off of the solar energy, innevitably involve the application to an article having a large area. Therefore, the application of hithertofore used metal oxides as transparent dielectric layer makes it impossible to industrially prepare optical laminar structures at low cost.

This is attributable to a fact that the technique has not yet been completed to uniformly cover the large surface area of a metal layer with an optically stable metal oxide. The reason is that, though a metal oxide layer can be conveniently formed from a metal layer by means of thermal oxidation when the thickness of the metal oxide layer is as thin as 50 Å or less, it is impossible to industrially prepare a metal oxide layer of uniform thickness and large size if the thickness of the metal oxide layer is about 1,000 Å in general as proposed by this invention.

As a method to obtain a metal oxide layer extending over a large area, a method is known, for instance, wherein a metal alkoxide compound is disolved in an appropriate solvent, coated, and dried to obtain a metal oxide. However, this method has some problems in that a layer having a uniform thickness of 500 Å or more is hardly obtainable and that since the coating solution hydrolyzes due to the presence of moisture in the air, it is necessary to have a special environment for the coating work which continues for hours.

As a result of the laborious research conducted with the object of providing an optical laminar structure having an excellent selective transparency as mentioned above at a low price by mass production so that it will be used widely in the general energy saving field, the inventors of this invention have found that the abovementioned object can be achieved by using organic polymers as materials for the transparent dielectric layer, though they have hitherto been refused to deal with as optical meterials because of their lack of uniformity in optical properties, sizable optical loss, and deficiency in long term stability, and completed the present invention.

A primary object of the invention is to provide an optical laminar structure having a laminate structure, a sandwich of two metal layers with a transparent dielectric layer of organic polymer laid in between them.

Another object of the invention is to provide a process for the preparation of the abovementioned optical laminar structure at a low price.

A further and separate object of the invention is to provide the abovementioned optical laminar structure having a specific optically selective transparency and also to provide said optical laminar structure having a good durability.

Still another object of the present invention is to provide said optical laminar structure suited for making a safety glass type laminated plate.

Additional objects and features of the invention will appear hereinafter and will be obvious from the following description.

To discuss the present invention in its broadest aspect, the objects and advantages of the invention are achieved by an optical laminar structure, in which a thin dielectric layer of transparent organic polymer arranged sandwich like in between two thin metal layers, located at least on one side of the transparent substrate (A).

The feature of this invention is embodied by the use of a thin layer of organic polymer as dielectric layer and accordingly it has been made possible to provide a transparent dielectric layer having a comparatively low refractive index at a low price in large quantity.

Figure 1:
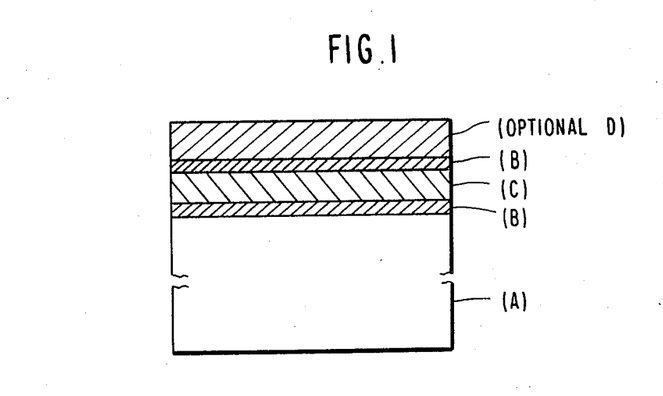
FIG. 1 shows a simple optical laminar structure of the invention.

More specifically, FIG. 1 shows a transparent substrate (A), a thin metal layer (B), a dielectric layer of an organic polymer (C) and an optional protective layer (D).

Figure 2:
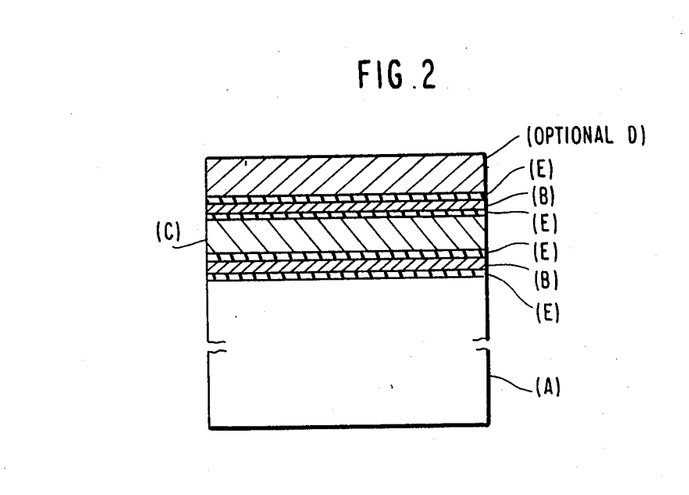
FIG. 2 shows another embodiment of an optical laminar structure of the invention.

FIG. 2 shows a more complicated structure than that shown in FIG. 1. The structure further has both a pre-treatment layer (E) and a post-treatment layer (E) on each of the thin metal layers (B).

The optical laminar structure of the present invention can be prepared according to the following procedure:

(i) To form a thin metal layer (B) at least on one side of the transparent substrate (A), (ii) To form a thin dielectric layer of organic polymer (C) on the upper side of said thin metal layer (B), and (iii) To form another thin metal layer (B) on the upper side of said thin dielectric layer of organic polymer (C).

No limit is placed upon the materials of the transparent substrate (A) and it does not matter whether it is made of inorganic materials or organic materials; however, an organic polymer film may be mentioned as a proper material to prepare said optical laminar structure at a low price in large quantity.

No limits are set to the kind of such organic polymer film; however, to meet one of the objects of the present invention to apply the optical laminar structure to a transparent window, the organic polymer film is required to have visible ray transparency expressed by a transmission factor of at least 75% or more at 550 m$\mu$, desirably 75% or more, and any known organic polymer films can be used so far as they satisfy this condition. Of such organic polymer films, polyethylene terephthalate film, polycarbonate film, polypropylene film, polyethylene film, polyethylene naphthalate film, polysulfone film, polyether sulfone film, and nylon film are desirable, especially polyethylene terephthalate film is desirably used.

Even if these organic polymer films are made to contain a colorant, ultraviolet absorber, pigment, etc. to such a degree as not damage their mechanical properties and optical properties, they can be useful as organic polymer films to be used in the present invention.

To speak of the thickness of said transparent substrate to be used in this invention, for instance, 0.5 mm to 10 mm is desirable in case of inorganic glass and 5 $\mu$m to 200 $\mu$m or more desirably 10 $\mu$m to 175 $\mu$m, is advisable in case of organic polymer films.

As the materials of a thin metal layer (B) to be used in the laminar structure of the present invention, any metals or their alloys can be used if their absorption loss in the visible ray region is small and their electric conductivity is high; however, gold (Au), silver (Ag), and copper (Cu), for instance, may be recommended and of all these metals, silver and an alloy mainly comprising silver are desirable.

As metals to be contained in silver, gold and copper are desirable; however, if the content is not so large as to degrade the physical properties of silver, any metals may be contained. The content of silver is an important factor which influences the optical properties of the obtained laminar structure and it is desirable to contain at least 40% by weight or more, desirably 50% by weight or more of silver.

By allowing silver to contain gold and/or copper, the durability of the optical laminar structure can be enhanced.

No limit is set to the thickness of a thin metal layer (B) if the obtained laminar structure satisfies the required optical properties inclusive of high transmissivity in the visible ray region and high reflectivity in the near infrared region; however, it is necessary for the thin metal layer to have a certain degree of continuity at least to cover an enough area to be called a layer. It is desirable for the thin metal layer to have a thickness of about 30 Å or more to develop from the state of islands to the state of continued expanse and a thickness of 500 Å or less to have a higher transmissivity in the visible ray region which is one of the objects of the present invention.

It is especially desirable to keep the thickness of the thin metal layer (B) in the range of about 40 Å or more and about 150 Å or less so that the optical laminar structure may have enough visible ray transmission factor and enough infra red reflection factor.

In this invention, the two metal layers which sandwich the transparent dielectric layer in between them may have a thickness different from each other and further they may be made of a material different from each other.

Different thicknesses, for instance, the thickness of the upper metal layer being made thinner than the thickness of the lower metal layer, can decrease the reflectivity in the visible ray region. In this case, it is advisable to keep the difference in thickness of the two metal layer in the range of 10% to 20% of the thickness of the thicker metal layer.

Also, the use of different materials for the upper metal layer and the lower metal layer makes it possible to control the hue of the obtained laminar structure. For example, when one metal layer is made of Ag and another is made of Au, with varied combination of their thicknesses, the hue can be controlled variously in the range between the blue hue and the light-green hue. The combined use of Ag and Cu makes it possible to give hues ranging from light brown to red.

As for the methods to form a thin metal layer, vacuum metallizing method, cathode sputtering method, ion plating method and all other conventionally known methods are adoptable; however, it is advisable to adopt the methods of forming a layer by means of high energy particles such as cathode sputtering method and ion plating method in order to obtain a stable layer having a thickness of 150 Å or less. In case where a thin alloy layer is formed, the cathode sputtering method is especially recommended in view of obtaining a layer of uniform alloy composition and of even thickness.

In forming a thin metal layer (B), the substrate can be subjected to the pretreatment according to any known methods so that the thin metal layer may be stabilized. These methods include, for instance, cleaning treatments such as ion bombardment, undercoating treatments such as coating of organic silicate, organic titanate, and organic zirconate compounds, and/or stabilization treatment by forming nuclei beforehand with the use of metals such as Ni, Ti, Si, Bi, Zr, V, Ta, etc. and their oxides according to the sputtering or other method. Any proper one selected from these method can be adopted while minding carefully that such treatment will not influence the optical properties of the obtained laminar structure adversely. In case where it is anticipated that said pretreatment will increase the thickness of the metal layer, the thickness of the pretreatment should desirably be less than 100 Å. The same treatment as thin pretreatment may be applied to the metal layer as a posttreatment.

What is described in the foregoing explanation can be applied not only to the first thin metal layer but also to the second thin metal layer which is to be formed on the dielectric layer described hereinafter.

Next, an explanation will be made as to the transparent organic polymer which forms the dielectric layer in the present invention. The dielectric layer of this invention comprises a transparent organic polymer and it is not necessary to place any specific limit on its kind in the broadest aspect.

Said transparent organic polymer is chosen from those whose refractive index is in the range of 1.35 to 1.65 and should desirably be solvent soluble. A wet coating method may be adopted as a means of forming the dielectric layer by use of a polymer thus chosen. The method can offer an industrially advantageous optical laminar structure through a simplified process of preparation.

From the viewpoint of adopting such a method as mentioned above, said solvent should preferably be an organic solvent and accordingly the transparent organic polymer to be used for forming the transparent dielectric layer should preferably be soluble in an organic solvent.

The degree of transparency of what is referred to as "transparent" in the above is transmission of 70% or more, preferably 80% or more, of ray of 500 m$\mu$ through a 1 (one) $\mu$m-thick layer and it is desirable to use a layer with the surface having the least possible uneveness.

As the organic polymers coming under such category, acrylonitrile resin (inclusive of methacrylonitrile resin), fluorine-contained resin, polyester resin, polystyrene resin, acrylic resin, polyvinyl formal resin, nylon resin, phenoxy resin, urethane resin and vinyl resin may be mentioned.

As the solvents to be used in forming a thin layer according to said wet coating method, selections may be made, for instance, from the solvents described in the "ORGANIC SOLVENTS" Techniques of Chemistry, volume II, Riddick and Bunger, WILEY-INTERSCIENCE, to determine in consideration of the kind of a polymer. Such ketone type solvents as acetone, methyl ethyl ketone, methyl isobutyl ketone, and cyclohexanone, such alcohol type solvents as methanol, ethanol, and isopropanol, such aromatic solvents as benzene, toluene, and xylene, such ester type solvents as ethyl acetate and methyl acetate, such saturated hydrocarbon type solvents as normal hexane, and dimethylformamide may be mentioned as the typycal solvents. It is desirable in the present invention that about 0.1 wt % or more, more preferably 0.3 wt % or more, most preferably 0.5 wt % or more of said polymer will dissolve in these solvents.

A transparent dielectric layer (C) of small piece can be obtained by coating an organic polymer with a solution of appropriate concentration prepared by dissolving 0.1 wt % to 10 wt % organic polymer in a solvent selected for the polymer by means of spin coating, bar coater or doctor knife coating, followed by drying.

A transparent dielectric layer (C) of large area having a desired thickness can be obtained by coating of said solution with a gravure roller coater, reverse roll coater, etc., followed by drying. The temperature required for drying varies depending upon the resin and solvent to be used but is usually in the range of 80° C. to 180° C.

In order to make the functional sheet of this invention to achieve its optical function, the transparent dielectric layer (C) should be made to have a thickness of 300 Å to 2,000 Å. Especially, it is desirable to set the thickness in the range of 500 Å to 1,500 Å to increase the transmission factor of the visible rays.

Also, it is especially desirable to set the thickness of the transparent dielectric layer (C) between 600 Å and 1,300 Å to make the functionable sheet of this invention into a laminar structure having the maximum transmission factor in the neibourhood of the representative wave length of 550 nm in the visible ray region.

In the case where an organic compound is used for the optical application like the laminar structure of the present invention, it is necessary to select and use a polymer of adequate purity and homogeneity, since the physical properties of the obtained coating influences the optical properties of the laminar structure and a careful selection should also be exercised as to the method of coating to obtain a coating of uniform thickness. The variation in the thickness of the coating from the prescribed thickness should preferably kept within ±5%.

The optical laminar structure of this invention is basically perfected by forming another thin metal layer according to the aforementioned procedure upon the transparent dielectric layer thus formed.

Of thus prepared optical laminar structures, those in which polyacrylonitrile, polymethacrylonitrile, copolymer of acrylonitrile and styrene, soluble nylon resin, polystyrene, polymethyl metaacrylate, soluble linear saturated polyester resin are used as organic polymer to make a dielectric layer are deemed to be desirable ones from the viewpoint of discoloration and durability made known from the results of the sunshine exposure test, sunshine weather meter test, and accelerated heat resistance test.

Those optical laminar structures, in which such fluorine-contained resins as a copolymer of vinyl fluoride and hexafluoropropylene, copolymer of vinyl fluoride and tetrafluoroethylene, copolymer of chlorotrifluoroethylene and vinyl fluoride, and copolymer of vinylidene fluoride and chlorotrifluoroethylene are used as organic polymer to form the dielectric layer, have not only excellent durability but also high selectivity since the fluorine-contained resins generally have a low refractive index and accordingly the obtained laminar structure has a high transmission factor in the visible ray region and a low transmission factor in the near infrared resion.

Especially in case where the dielectric layer is made from an organic polymer such as polymethacrylonitrile, polyacrylonitrile, copolymer of acrylonitrile and styrene, copolymer of nylon 6, nylon 6/6 and nylon 6/10, such soluble nylon resins as N-methoxymethyl-nylon 6 and N-methoxymethylnylon 6/6, aforementioned fluorine-contained resins, and such solvent soluble polyester resins as Vytel ® (product of Goodyear Tire & Rubber Co.) and the obtained optical laminar structure is built in the laminated glass which is widely used for the windows of cars, aircraft, buildings, etc., said laminated glass has a good appearance free from defects such as cracks, etc.

More especially in case where the dielectric layer is made from polymethacrylonitrile or copolymer of acrylonitrile and styrene and the obtained optical laminar structure is used in the laminated glass as mentioned above, it give a most durable laminated glass.

In case where the optical laminar structure of this invention is used for the window glass of cars and trains where good look-through transparency is a special requirement, the use of biaxially oriented polyethylene terephthalate film having a thickness of 10 μm to 175 μm for the transparent substrate, a thin metal layer of 40 Å to 100 Å containing at least 60% or more Ag for the thin metal layer, and a layer of polymethacrylonitrile, copolymer of acrylonitrile and styrene, polystyrene, polymethyl methacrylate, or fluorine-contained resin having a thickness of 550 Å to 1,000 Å for the transparent dielectric layer is advisable. With this structural arrangement, an optical laminar structure having excellent optical properties including a visible ray transmission factor of 60% or more, near infrared ray transmission factor of 50% or less, and infrared transmission factor of 60% or less can be prepared at a low price on the industrial scale.

In the formation of the thin metal layer mentioned in the above, a pretreatment layer (E) of Ti, Ni, Bi, Zr, or Si is first deposited as metal element to a thickness of 5 Å to 50 Å, on which a thin metal layer is formed, and then a posttreatment layer (E) is deposited thereon to a thickness of 5 Å to 50 Å in the same way as the pretreatment layer. This method provides an optical laminar structure having an outstanding durability.

The optical laminar structure of this invention may further have a protective layer (D) formed on its outside surface with the object of protecting the laminar structure which has optical functions. This protective layer (D) has a role to protect the optical laminar structure of the present invention from the mechanical damages and infiltration of chemical polutants and water vapor.

To achieve the object of such role and not to influence the optical properties of the optical laminar structure unfavorably, it is advisable for the formation of the protective layer (D) to use a material which is optically transparent and highly protective. As the materials of the protective layer (D) to be used in the present invention, a layer comprising inorganic compound or compounds, i.e. an oxide of Si, Al, Ti, Zr, or Ta or an oxide mixture of two or three of said metals, or a layer comprising organic compound or compounds, i.e. such acrylic resins as polyacrylo nitrile, polymethacrylonitrile, polymethyl metaacrylate, etc. and their copolymers, polystyrene resin, vinyl acetate resin, phenoxy resin, polyester resin, polyurethane resin, etc. and a mixture and copolymer thereof is desirably used.

When the optical laminar structure is expected to be used in a severe environment, the protective layer (D) can be formed by laminating polyethylene film, polypropylene film, nylon film, triacetate film, polyester film, polyvinyl butyral sheet, polycarbonate sheet, etc. of different thicknesses according to any known method.

When a layer of inorganic compound is used as the protective layer (D), physical methods of preparing it such as vacuum metallizing, sputtering, ion plating, etc. are favorably adopted and in addition to these physical methods, the protective layer (D) can be formed according to the known metal oxide layer forming method in which a metal alkoxide compound is diluted in an appropriate solvent and coated.

When a layer of organic compound is used as the protective layer (D), any of the aforementioned resins is dissolved in an appropriate solvent, coated, and dried to obtain the protective layer (D) of organic compound. The protective layer (D) of the present invention is not limited to a single layer but may be a laminated structure consisting of two or three layers. This laminated structure may be one consisting of an inorganic compound and organic compound, or one consisting of organic compounds, or one consisting of inorganic compounds, the respective compounds differing from each other. By adopting the above-mentioned laminated structure as the protective layer (D), it is possible to obtain a protective layer (D) having an excellent protective function for the optical laminar structure of this invention.

The thickness of the protective layer (D) of the present invention may not necessarily be defined provided that it is strong enough to protect the optical laminar structure, however, to speak in terms of protectingness, the thickness should desirably be 0.05 μm or more, and to speak in terms of optical properties, it should be 50 μm or less, preferably 35 μm or less.

The functional sheet (optical laminar structure) of this invention can be used in various ways to meet its specific applications. For instance, when it is used for the building window, it may be directly applied to the surface of the wondow glass with the use of an adhesive or it may be placed in between a laminated window glass. When it is used for the car window, it may be laid in between a laminated glass known as a safety glass or non-shatterable glass by use of polyvinyl butyral according to any known method. At this time of making a laminated window glass with the functional sheet laid in between two sheets of glass, a unit of whole glass structural components is prelaminated at a temperature of 70° to 120° C. while being deaerated under reduced pressure and then pressed at a temperature of 90° C. to 150° C. to complete the adherence.

During this laminating process, cases not unfrequently occur in which cracks develop on the optical laminar structure under the influence of temperature and pressure to mar the appearance of the obtained laminated glass. However, such damage can be avoided by making a wellguided selection of the transparent organic polymer, from which the dielectric layer is made to constitute the optical laminar structure, as described hereinbefore. In this way, a laminated glass having a visible ray transmission factor of 60% or more, preferably 70% or more, more preferably 75% or more, a near infrared transmission factor of 50% or less, preferably 45% or less, more preferably 30% or less, and a visible ray reflection factor of 18% or less, preferably 14% or less, more preferably 12% or less can be provided.

To facilitate such object, when the composition of the optical laminar structure of this invention is made to have a thin metal layer of 40 Å to 90 Å thickness and a transparent dielectric layer of 600 Å to 900 Å thickness, a laminated glass having a visible ray reflection factor of 14% or less and a visible ray transmission factor of 70% or more, determined according to the JIS (Japan Industrial Standards) can be provided and when the thin metal layer is made to have a thickness of 40 Å to 65 Å and the transparent dielectric layer to have a thickness of 600 Å to 1500 Å, a laminated glass having a visible ray reflection factor of 11% or less and a visible ray transmission factor of 75% or more, determined according to the same standards can be provided.

Further, when the laminated glass in which the optical laminar structure mentioned above is built in through such a way, for instance, as mentioned in Example is prepared, it exhibits about same optical properties as the optical laminar structure used therein.

As mentioned in the above, in the preparation of the functional sheet of the present invention, a mode of structure most suited for the desired application can be selected and accordingly thus prepared functional sheet can be used most effectively not only for controlling the incidence of solar energy but also in all fields where the prevention of heat wave radiation is required.

The following Examples illustrate the invention concretely.

EXAMPLE 1

A functional sheet was prepared, comprising a biaxially oriented polyethylene terephthalate film having a thickness of 50 μm to be used as a substrate, a thin alloy layer of silver and copper (containing 10 wt % Copper) having a thickness of 80 Å formed thereon as the first layer, a transparent dielectric layer of polymethacrylonitrile having a thickness of 900 Å formed thereon as the second layer, and a thin alloy layer of silver and copper (containing 10 wt % copper) having a thickness of 80 Å formed thereon as the third layer. The thin alloy layer of silver and copper (containing 10 wt % copper) was formed according to the DC magnetron sputtering method with a target of silver-copper alloy containing 10 wt % copper in Ar gass under pressure of $5 \times 10^{-3}$ Torr. The making current was 2 W/cm² per unit area of the target. The transparent dielectric layer was obtained by coating a solution, which had been prepared by dissolving 2 wt % polymethacrylonitrile in a solvent comprising 1 part of methyl ethyl ketone and 1 part of cyclohexanone, with the use of a bar coater, followed by drying at 120° C. for 3 minutes.

The obtained functional sheet had an integral visible ray transmission factor (400~700 nm) of 72% and an integral near infrared transmission factor (750~2,100 nm) of 28%.

The integral visible ray transmission factor (400 nm~700 nm) and integral near infrared ray transmission factor (750 nm~2,100 nm) were determined according to the following method in all Examples.

| | "Solar energy intensity factor distribution" | |
|---|---|---|
| Region | Wavelength nm (λi) | Distribution (Gλi) |
| Near ultraviolet ray | 350 | 1.27 |
| | 400 | 3.17 |
| Visible ray | 450 | 6.79 |
| | 500 | 8.2 |
| | 550 | 8.03 |
| | 600 | 7.88 |
| | 650 | 7.92 |
| | 700 | 7.48 |
| Near infrared ray | 750 | 5.85 |
| | 800 | 5.78 |
| | 850 | 5.66 |
| | 900 | 3.24 |
| | 950 | 3.29 |
| | 1000 | 4.25 |
| | 1050 | 3.72 |
| | 1100 | 1.70 |
| | 1150 | 1.46 |
| | 1200 | 2.51 |
| | 1250 | 2.21 |
| | 1300 | 1.78 |
| | 1350 | 0.12 |
| | 1400 | |
| | 1450 | 0.16 |
| | 1500 | 1.06 |
| | 1550 | 1.49 |
| | 1600 | 1.36 |
| | 1650 | 1.17 |
| | 1700 | 0.89 |
| | 1750 | 0.54 |
| | 1800 | |
| | 1850 | |
| | 1900 | |
| | 1950 | 0.12 |
| | 2000 | 0.02 |
| | 2050 | 0.26 |
| | 2100 | 0.58 |

$$\text{Integral visible ray transmission factor} = \frac{\sum_{i=450}^{700} G\lambda i \times Ti}{\sum_{i=450}^{700} G\lambda i}$$

$$\text{Integral near infrared ray transmission factor} = \frac{\sum_{i=750}^{2100} G\lambda i \times Ti}{\sum_{i=750}^{2100} G\lambda i}$$

wherein Ti indicates a transmission factor.

EXAMPLE 2

A functional sheet was prepared according to Example 1, wherein thin metal layers of silver only were formed in the place of the thin alloy layers of silver and copper. The thin metal layers of silver only were formed according to the magnetron sputtering method with a target of silver in Ar gas under pressure of $5 \times 10^{-3}$ Torr. The thickness of the thin metal layer of silver was 80 Å. The obtained functional sheet had an integral visible ray transmission factor of 70% and an integral near infrared ray transmission factor of 25%.

EXAMPLES 3~5

A functional sheet was obtained by forming a pretreatment layer 20 Å thick deposited as metal X as shown in Table 1 upon a biaxially oriented polyethylene terephthalate film having a thickness of 75 μm, upon which a thin alloy layer of silver and copper containing 5 wt % of copper was formed to a thickness of 70 Å, upon which a posttreatment layer 20 Å thick deposited as metal X was formed, upon which a transparent dielectric layer of polymethacrylonitrile having a thickness of 800 Å was laid, upon which a pretreatment layer 20 Å thick deposited as metal X was formed, upon which a thin alloy layer of silver and copper containing 5 wt % of copper was formed to a thickness of 70 Å, and a posttreatment layer 20 Å thick deposited as metal X was formed thereupon.

The thin alloy layer of silver and copper containing 5 wt % copper was formed after the DC magnetron sputtering method with a target of silvercopper alloy containing 5 wt % copper according to the procedure of Example 1.

The pretreatment layer and the posttreatment layer were respectively obtained by forming a thin layer of metal X after the RF magnetron sputtering method with a target of metal X (Si, Zr, Ti) and then leaving it in the atmosphere for 10 minutes.

The transparent dielectric layer of polymethacrylonitrile was made according to the same procedure as in Example 1. The optical properties of the obtained functional sheet are shown in Table 1.

TABLE 1

| Example | Metal X | Integral visible ray transmission factor (%) | Integral near infrared ray transmission factor (%) |
|---|---|---|---|
| 3 | Si | 74 | 34 |
| 4 | Ti | 77 | 35 |
| 5 | Zr | 76 | 32 |

EXAMPLE 6

A functional sheet was prepared according to the same procedure as in Example 1, wherein the thin alloy layers were replaced with thin alloy layers of silver and gold containing 10 wt % gold. The thin alloy layers of silver and gold containing 10% gold were made after the same DC magnetron sputtering method as in Example 1 with the use of a target of silver-gold alloy containing 10 wt % gold. The thickness of the thin alloy layers of silver and gold was 70 Å.

The obtained functional sheet had an integral visible ray transmission factor of 76% and an integral infrared ray transmission factor of 32%. A layer of polymethacrylonitrile having a thickness of 2 μm on the functional sheet as a protective layer. This 2 μm thick polymethacrylonitrile layer was obtained by coating a solution prepared by dissolving 10 wt % polymethacrylonitrile in a solvent consisting of 1 part of cyclohexanone and 1 part of methyl ethyl ketone with the use of a bar coater, followed by drying at 130° C. for 3 minutes. The obtained functional sheet had an integral visible ray transmission factor of 70% and an integral near infrared ray transmission factor of 33%.

EXAMPLE 7

The functional sheet obtained in Example 1 had both its sides respectively been laminated with a polyvinyl butyral sheet having a thickness of 380 μm and was then sandwiched in between two glass plates each 3 mm thick. This set of layers was kept at a temperature of 90° C. under reduced pressure for 60 minutes to effect preadherence between the layers and a laminated glass structure was thus obtained. The obtained laminated glass structure with the functional sheet laid in itself had an integral visible ray transmission factor of 71%, integral near infrared ray transmission factor of 31%, and integral visible ray reflection factor of 12%. The laminated glass thus preadhered was then placed in the autoclave and treated in $N_2$ gass under pressure of 10 atm at 125° C. for 60 minutes to perfect its adherence; however, it was found that the laminated glass suffered from neither degradation of its appearance nor deterioration of its optical properties.

EXAMPLE 8

A functional sheet was obtained according to the same procedure as Example 1, with the exception of forming the transparent dielectric layer of polystyrene having a thickness of 1,000 Å as the second layer.

The transparent dielectric layer of polystyrene was obtained by coating a solution prepared by dissolving 2.5 wt % polystyrene in a solvent consisting of 7 parts of methyl ethyl ketone and 3 parts of toluene with the use of the bar coater, followed by drying at 120° C. for 2 minutes.

The obtained functional sheet had an integral visible ray transmission factor of 71% and an integral near infrared ray transmission factor of 30%.

EXAMPLE 9

A functional sheet was obtained according to the same procedure as Example 1, with the exception of forming the transparent dielectric layer of polymethyl methacrylate having a thickness of 800 Å as the second layer.

The transparent dielectric layer of polymethyl methacrylate was obtained by coating a solution prepared by dissolving 2 wt % polymethyl methacrylate resin in a solvent consisting of 2 parts of methyl isobutyl ketone and 3 parts of methyl ethyl ketone with the use of the bar coater, followed by drying at 120° C. for 2 minutes.

The obtained functional sheet had an integral visible ray transmission factor of 7.2% and an integral near infrared ray transmission factor of 30%.

EXAMPLE 10

A functional sheet was prepared, comprising a biaxially oriented polyethylene terephthalate film having a thickness of 50 μm to be used as a substrate, a thin alloy layer of silver and copper (containing 10 wt % copper) having a thickness of 80 Å formed thereon as the first layer, a transparent dielectric layer of copolymer of vinyl fluoride and hexafluoropropylene having a thickness of 1,100 Å formed thereon as the second layer, and a thin alloy layer of silver and copper having a thickness of 80 Å formed thereon as the third layer. The thin alloy layers of silver and copper having a thickness of 80 Å were formed according to the procedure of Example 1. The transparent dielectric layer was obtained by coating a solution, which had been prepared by dissolving 3 wt % copolymer of vinyl fluoride and hexafluoropropylene in a solvent comprising 1 part of methyl ethyl ketone and 1 part of methyl isobutyl ketone, with the use of a bar coater, followed by drying at 120° C. for 2 minutes. The obtained functional sheet had an integral visible ray transmission factor of 72% and an integral near infrared ray transmission factor of 30%.

EXAMPLE 11

A functional sheet was obtained, comprising a substrate of biaxially oriented polyethylene terephthalate film having a thickness of 125 μm, a thin alloy layer of silver and copper (containing 10 wt % copper) having a thickness of 90 Å formed thereon as the first layer, a transparent dielectric layer of co-polymer of 60 mol % polyacrylonitrile and 40 mol % polystyrene having a thickness of 1,000 Å formed thereon as the second layer, and a thin alloy layer of silver and copper formed thereon as the third layer in the same way as the first layer, each laid one upon another. The thin alloy layers of silver and copper, or the first and third layers, were formed according to the same way as in Example 1. The transparent dielectric layer, or the second layer, was obtained by coating a solution prepared by dissolving 2 wt % copolymer of acrylonitrile and styrene in a solvent comprising 3 parts of methyl ethyl ketone and 7 parts of cyclohexanone with the use of a bar coater, followed by drying at 130° C. for 3 minutes. The obtained functional sheet had an integral visible ray transmission factor of 69% and an integral near infrared ray transmission factor of 24%.

EXAMPLE 12

A functional sheet was formed according to the same procedure as in Example 1, with the exception of forming the transparent dielectric layer, or the second layer, of polyvinyl butyral having a thickness of 900 Å.

The transparent dielectric layer of polyvinyl butyral was obtained by coating a solution prepared by dissolving 2 wt % polyvinyl butyral in a solvent consisting of 5 parts of isopropanol and 2 parts of methanol with a bar coater, followed by drying at 100° C. for 3 minutes.

The obtained functional sheet had an integral visible ray transmission factor of 70% and an integral near infrared ray transmission factor of 28%.

EXAMPLE 13

A functional sheet was prepared according to Example 1, wherein the transparent dielectric layer constituting the second layer was formed from a nylon resin to have a thickness of 1,000 Å.

The transparent dielectric layer of nylon resin was obtained by coating a solution prepared by dissolving 2 wt % soluble nylon resin (Amilan 4000 manufactured by Toray Industries, Inc.) in a mixed solvent consisting of 1 part of ethanol and 3 parts of methanol with the use of a bar coater, followed by drying at 110° C. for 3 minutes.

The obtained functional sheet had an integral visible ray transmission factor of 71% and an integral near infrared ray transmission factor of 30%.

EXAMPLE 14

A functional sheet was prepared according to Example 1, wherein the transparent dielectric layer constituting the second layer was formed from a polyester resin to have a thickness of 800 Å.

The transparent dielectric layer of polyester resin was obtained by coating a solution prepared by dissolving 1.8 wt % of polyester resin (Vylon 200 manufactured by Toyobo Co., Ltd.) in a mixed solvent consisting of 5 parts of methyl ethyl ketone, 3 parts of ethyl acetate, and 2 parts of cyclohexanone with the use of a bar coater, followed by drying at 120° C. for 2 minutes.

The obtained functional sheet had an integral visible ray transmission factor of 72% and an integral near infrared ray transmission factor of 31%.

EXAMPLE 15

The functional sheets obtained in Example 1, Example 8, Example 9, Example 11, Example 12, Example 13, and Example 14 were respectively put on a glass plate with the processed side facing the glass plate by use of a double adhesive tape and irradiated by a carbon arc lamp from the glass plate side for 500 hours with a fade meter (FAS-3 manufactured by Suga Testing Machine Co.); however, no trace of coloring, deterioration, etc. was observed in every specimen.

EXAMPLES 16, 17, and 18

Laminated glass plates were prepared by sandwiching the functional sheets obtained in Example 10, Example 11, and Example 13 respectively in between the two glass plates according to the same procedure as in Example 7. No qualitative changes such as cracks, opaque or turbidity, coloring, etc. attributable to the functional sheets were not found on the obtained laminated glass plates. The optical properties of these laminated glass plates are shown in Table 1.

TABLE 1

| Example | Functional sheet used | Integral visible ray transmission factor (%) | Integral visible ray reflection factor (%) | Integral near infrared ray transmission factor (%) |
|---|---|---|---|---|
| 16 | Functional sheet of Example 10 | 73 | 10 | 27 |
| 17 | Functional sheet of Example 11 | 70 | 11 | 25 |
| 18 | Functional sheet of Example 13 | 72 | 11 | 28 |

EXAMPLE 19

A laminated structure of large size according to the present invention was obtained using a roll of biaxially oriented polyester film, 50 cm wide, 50 μm thick, and 500 m long, as a substrate.

On this polyester film substrate, a thin alloy layer of silver and copper (containing 10 wt % copper) was formed to a thickness of 90 Å as the first layer, a transparent dielectric layer of polymethacrylonitrile was formed thereon to a thickness of 1,000 Å as the second layer, a thin alloy layer of silver and copper (containing 10 wt % copper) was formed thereon to a thickness of 90 Å as the third layer, and a transparent protective layer of polymethacrylonitrile was formed thereon to a thickness of 500 Å as the fourth layer one upon another in this order.

The thin silver-copper alloy layer (containing 10 wt % copper) which constituted the first layer and third layer in the laminated structure were prepared as follows. The roll of polyester film was set in the continuous sputtering machine, which was then evacuated to the pressure of $1 \times 10^{-5}$ Torr. Thereafter, Ar gas was introduced into the sputtering machine to the pressure of $5 \times 10^{-3}$ Torr and, while keeping the flow rate at 50 SCCM, the first layer was formed according to the DC magnetron sputtering method with the use of a silver-copper alloy (containing 10 wt % copper) as a target with the application of DC voltage at the film running rate of 10 m/min.

The third layer was formed by the same way as that of the first layer, after the transparent dielectric layer was formed.

The transparent dielectric layer of polymethacrylonitrile was formed by use of a solution prepared by dissolving 2 wt % polymethacrylonitrile in a mixed solvent of 1 part of cyclohexanon and 2 parts of methyl ethyl ketone as a coating solution with a gravure roll coating machine equipped with a 300 mesh gravure roll at the film running rate of 20 m/min. The drying temperature was 120° C.

The transparent protective layer was formed by coating a solution prepared by dissolving 0.8 wt % polymethacrylonitrile in a mixed solvent comprising 1 part of cyclohexanone and 2 parts of methyl ethyl ketone with the abovementioned gravure roll coating machine.

A total of 30 specimens, sampled at 10 places in the machine direction X 3 places thereon in the traverse direction, were prepared from the obtained laminated structure to compare the optical properties of the respective specimens. The result showed that their integral visible ray transmission factors were in the range of 70±2% and integral near infrared ray transmission factors were in the range of 31±2.5%. No difference was observed in their tones. It was found that the laminated structure having uniform optical properties extending over the wide area was obtained.

EXAMPLE 20

A functional sheet was obtained, comprising a metal layer of titanium formed to a thickness of 20 Å as the pretreatment layer on a polyethylene terephthalate film having a thickness of 100 μm, an alloy layer of silver and copper (containing 10 wt % copper) formed to a thickness of 80 Å thereon as the first metal layer, a metal layer of titanium formed thereon to a thickness of 20 Å as the posttreatment layer, a transparent dielectric layer of polymethacrylonitrile formed thereon to a thickness of 900 Å as the second layer, a metal layer of titanium formed thereon to a thickness of 20 Å as the pretreatment layer, an alloy layer of silver and copper (containing 10 wt % copper) formed thereon to a thickness of 80 Å as the third layer, and a metal layer of titanium formed thereon to a thickness of 20 Å as the posttreatment layer, each laid one upon another.

The metal layers of titanium having a thickness of 20 Å and the alloy layers of silver and copper containing 10 wt % copper having a thickness of 80 Å were formed according to the DC magnetron sputtering method with the use of titanium as a target and with the use of silver-copper alloy (containing 10 wt % copper) as a target respectively.

The metal layer of titanium, the alloy layer of silver and copper, and the metal layer of titanium were formed in a vacuum chamber continuously upon another.

The transparent dielectric layer of polymethacrylonitrile was obtained by coating a solution prepared by dissolving 2 wt % polymethacrylonitrile in a solvent comprising 3 parts of methyl ethyl ketone, 4 parts of cyclohexanone, and 1 part of methyl isobutyl ketone with a bar coater.

The obtained functional sheet had an integral visible ray transmission factor of 74% and an integral near infrared transmission factor of 29%.

When this functional sheet was laid in a laminated glass according to the same procedure as in Example 7, no coloring and development of craks were observed to deteriorate the appearance of the laminated glass.

EXAMPLE 21

A ray selective functional sheet was prepared, comprising a biaxially oriented polyethylene terephthalate film having a thickness of 50 μm used as a substrate, an alloy layer of silver and copper (containing 10 wt % copper) formed thereon to a thickness of 80 Å as the first layer, a transparent dielectric layer of polyacrylonitrile formed thereon to a thickness of 900 Å as the second layer, and an alloy layer of silver and copper (containing 10 wt % copper) formed thereon to a thickness of 80 Å as the third layer. The alloy layers of silver and copper (containing 10 wt % copper) were formed according to the DC magnetron sputtering method with the use of silver-copper alloy (containing 10 wt % copper) as a target in Ar gas under pressure of $5\times10^{-3}$ Torr. The input power was 2 W/cm$^2$ per unit area of the target. The transparent dielectric layer was obtained by coating a solution prepared by dissolving 2 wt % polyacrylonitrile in a solvent N.N′-dimethylformamide, followed by drying at 120° C. for 3 minutes.

The obtained ray selective functional sheet had an integral visible ray transmission factor (450~700 nm) of 72% and an integral near infrared ray transmission factor (750~2100 nm) of 30%.

EXAMPLE 22

A functional sheet was obtained, comprising a metal layer of titanium formed to a thickness of 15 Å as the pretreatment layer on a polyethylene terephthalate film having a thickness of 100 μm, an alloy layer of silver and copper (containing 10 wt % copper) formed thereon to a thickness of 55 Å as the first layer, a metal layer of titanium formed thereon to a thickness of 15 Å as the posttreatment layer, a transparent dielectric layer of polymethacrylonitrile formed thereon to a thickness of 800 Å as the second layer, a metal layer of titanium formed thereon to a thickness of 15 Å as the pretreatment layer, an alloy layer of silver and copper (containing 10 wt % copper) formed thereon to a thickness of 55 Å as the third layer, and a metal layer of titanium formed thereon to a thickness of 15 Å as the posttreatment layer, each laid one upon another.

The metal layers of titanium having a thickness of 15 Å and the alloy layers of silver and copper (containing 10 wt % copper) having a thickness of 55 Å were formed according to the DC magnetron sputtering method with the use of titanium as a target and with the use of silver-copper alloy (containing 10 wt % copper) as a target respectively.

The metal layer of titanium, the alloy layer of silver and copper, and the metal layer of titanium were formed in a vacuum chamber continuously one upon another.

The transparent dielectric layer of polymethacrylonitrile was obtained by coating a solution prepared by dissolving 1.8 wt % polymethacrylonitrile in a mixed solvent comprising 3 parts of methyl ethyl ketone, 2 parts of cyclohexanone, and 1 part of acetone with a bar coater.

The obtained functional sheet had an integral visible ray transmission factor of 74% and an integral near infrared ray transmission factor of 41%.

This functional sheet had then a polyvinyl butyral sheet having a thickness of 380 μm laminated on both sides respectively and was then sandwiched in between transparent glass plates having a thickness of 3 mm.

This sandwich lamination had air removed from around its polyvinyl butyral sheets under reduced pressure at 90° C. with a load of 1 kg/cm$^2$ applied to the glass plate. The sandwich lamination was kept under such conditions for 60 minutes to have its adherence enhanced, thus offering a laminated glass structure.

Thus obtained laminated glass structure with the functional sheet laid within had an integral visible ray transmission factor of 73% and an integral near infrared ray transmission factor of 38%.

The integral visible ray transmission factor and integral visible ray reflection factor of the laminated glass structure with the functional sheet laid within were measured according to the spectrophotometric determination provided in JIS R 3212 and JIS Z 8722. The integral vible ray transmission factor was 77% and the integral visible ray reflection factor was 9%.

The laminated glass structure with the functional sheet laid within was furthermore placed in an autoclave and kept in the atmosphere of $N_2$ gas under pressure of 15 atm at 120° C. for 30 minutes to have its adherence perfected.

Even after such treatment, the laminated glass structure showed no change in its appearance and optical properties.

We claim:

1. An optical laminar structure being transparent for visible light and reflective for near infrared light comprising a dielectric layer arranged sandwichlike between thin metal layers, located on a transparent substrate, characterized in that the dielectric layer comprises a 30 nm to 200 nm (300 Å to 2,000 Å) thick transparent organic polymer layer with a refractive index in the range of 1.35 to 1.65, the thin metal layer has a thickness of about 4 nm to about 15 nm (about 40 Å to about 150 Å) and the transparent substrate is a 0.5 mm to 10 mm thick inorganic glass sheet or a 5 μm to 200 μm thick organic polymer film.

2. An optical laminar structure as claimed in claim 1 wherein said thin metal layers are respectively sandwiched between a pretreatment layer and a post-treatment layer of titanium, nickel, bismuth, zirconium or silicon.

3. An optical laminar structure as claimed in claim 1, wherein said transparent substrate is a biaxially oriented polyethylene terephthalate film, said thin metal layers are formed of a metal or an alloy comprising silver, gold or copper, and said dielectric layer is formed of an acrylonitrile resin, a polyamide resin, a copolymer of acrylonitrile and styrene, a polystyrene, or a polymethacrylate and has a thickness in the range of 50 nm to 150 nm (500 Å to 1,500 Å).

4. An optical laminar structure as claimed in claim 3 wherein said thin metal layers are respectively sandwiched between a pretreatment layer and a post-treatment layer of titanium, nickel, bismuth, zirconium or silicon.

5. A process for making an optical laminar structure being transparent for visible light and reflective for near infrared light, in which a dielectric layer arranged sandwichlike between thin metal layers is located on a transparent substrate, comprising:

(i) depositing on the transparent substrate comprising a 0.5 mm to 10 mm thick inorganic glass sheet or a 5 μm to 200 μm thick organic polymer film a thin metal layer (a) of thickness about 4 nm to about 15 nm (about 40 Å to about 150 Å) by a physical vapour deposition method, (ii) arranging, on the thin metal layer (A) the dielectric layer (B) of an organic polymer of thickness 30 nm to 200 nm (300 Å to 2,000 Å) by coating thereon a solution of said organic polymer, followed by drying; and (iii) depositing on the dielectric layer (B) a thin metal layer (C) of thickness about 4 nm to about 15 nm (about 40 Å to about 150 Å) by a physical vapour deposition method.

* * * * *